Figure 1:
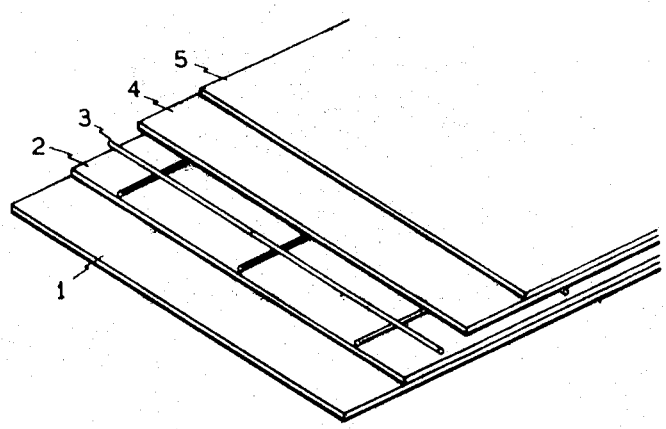

United States Patent

[11] 3,623,934

[72] Inventor Philippe Madou
 25 Avenue Roosevelt, Gent, Belgium
[21] Appl. No. 54,468
[22] Filed July 13, 1970
[45] Patented Nov. 30, 1971

[54] FIRE-RESISTANT LAMINATED SHEETING
 2 Claims, 2 Drawing Figs.
[52] U.S. Cl................................................... 161/5 F,
 161/89, 161/92, 161/143, 161/270
[51] Int. Cl........................................................B32b 21/10,
 B32b 5/22
[50] Field of Search............................................ 161/47, 82,
 84, 85, 89, 92, 94, 95, 142, 143, 270, 403, 57

[56] References Cited
UNITED STATES PATENTS

| | | | |
|---|---|---|---|
| 3,468,747 | 9/1969 | Tatnall.......................... | 161/89 X |
| 3,318,063 | 5/1967 | Stone et al.................... | 161/89 X |
| 2,713,551 | 7/1955 | Kennedy....................... | 161/47 X |
| 2,404,994 | 7/1946 | Supack.......................... | 161/92 X |
| 2,166,289 | 7/1939 | Finke............................. | 161/270 X |

*Primary Examiner*—Robert F. Burnett
*Assistant Examiner*—Mark A. Litman
*Attorney*—Kurt Kelman ABSTRACT: A fire-resistant laminated sheeting consisting of an aluminum sheet, a fire-resistant Kraft paper sheet, a metallic reinforcing grating, a sheet of asbestos, and a vinyl synthetic resin film, the layers of the laminate being bonded together by a synthetic fire-resistant bonding agent.

PATENTED NOV 30 1971

3,623,934

INVENTOR

PHILIPPE MADOU

BY Kurt Kelman

AGENT

FIRE-RESISTANT LAMINATED SHEETING

The present invention relates to an improved fire-resistant laminated sheeting useful, for instance, as a structural element in forming building ceilings, particularly in industrial buildings.

The term "fire-resistant," as used throughout the specification and claims, includes the properties of fire or flameproofing as well as fire-retardant.

It is known to make fire-resistant ceilings from fire-resistant textiles and like fibrous materials, for instance, but such materials are generally quite voluminous and their mechanical resistance is low. Also, the known fire-resistant materials used for this purpose are generally porous, i.e. they are permeable to air and moisture.

It is the primary object of this invention to overcome these disadvantages and to provide a fire-resistant sheeting which combines the desired qualities of fire resistance with excellent mechanical properties, is impermeable to air and water vapor, sturdy and economical to produce.

It is another object of the invention to provide such a sheeting of reduced thickness which may be stored in rolls containing considerable lengths of the sheeting.

The above and other objects are accomplished according to the invention with a sheeting which consists of successive layers of an aluminum sheet, a sheet of fire-resistant Kraft paper, a metallic reinforcing grating, a sheet of asbestos, and a vinyl synthetic resin film. The aluminum and Kraft paper sheets, the Kraft paper and asbestos sheets, and the asbestos sheet and vinyl film are bonded to each other by a synthetic fire-resistant bonding agent, the bonding agent between the Kraft paper and asbestos sheets passing through the meshes defined by the metallic grating.

Many synthetic bonding agents suitable for the purpose are readily available commercially. Their exact compositions are usually kept secret by the respective manufacturers and play no role in the practice of the present invention. All that is required is an adhesive which will bond the enumerated laminations to each other. Any manufacturer of adhesives and/or glues will readily provide suitable bonding agents upon request for bonding aluminum and Kraft paper, Kraft paper and asbestos, and asbestos and vinyl to each other. Also, such commercially available adhesives or glues can be obtained in a fire-resistant quality, a suitable fireproofing agent, such as an antimony compound being incorporated in the adhesive.

A useful bonding agent may be a polyvinyl alcohol or epoxy resin base adhesive having incorporated therein an effective amount of an antimony fireproofing agent, such as antimony oxychloride, antimony trichloride, antimony trioxide or antimony trisulfide.

The fire-resistant Kraft paper also is manufactured by incorporating therein a suitable fireproofing agent, such as one of the antimony compounds listed hereinabove. Such fire-resistant Kraft papers also are readily commercially available.

The vinyl synthetic resin film may consist of polyvinyl chloride or any other suitable air- and vapor-impermeable vinyl resin, as available commercially.

Thus, it will be noted that all components of the laminated sheeting of the present invention are readily available articles of commerce, this invention being directed to a new and useful combination of these materials in a laminate rather than being concerned with the specific composition of the components which those skilled in the art can readily buy on the open market upon merely specifying the required properties and without knowing the specific composition thereof.

Figure 2:
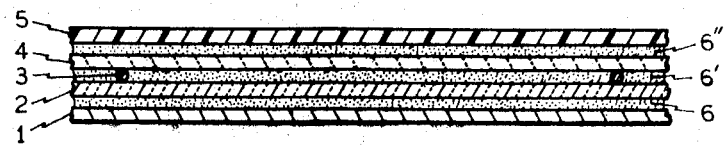

The above and other objects, advantages and features of the invention will become more apparent from the following detailed description of a preferred embodiment taken in conjunction with the accompanying drawing wherein FIG. 1 is a perspective view of a laminated sheeting according to the present invention, the laminations being displaced in respect of each other to facilitate an understanding of the structure, and FIG. 2 is a cross-sectional view of the laminated sheeting.

Referring now to the drawing, the sheeting is shown to be constituted by an outer aluminum sheet 1, a sheet of fire-resistant Kraft paper 2, an asbestos sheet 4, a reinforcing metallic grating 3 interposed between the Kraft paper and asbestos, and a covering vinyl film 5. These laminations are bonded to each other by means of adhesive layers 6, 6' and 6'', respectively, of a fire-resistant synthetic bonding agent, the same adhesive being used for all layers and the bonding agent of layer 6' passing through the meshes defined by grating 3.

The materials of the laminations are selected for the following purposes and reasons.

The vinyl film used as an outer layer of the laminated sheeting makes the entire sheeting impermeable to vapor, thus preventing the passage of moisture and other corrosive vapors through the sheeting and its condensation under the roof when the sheeting is used as a ceiling. Vinyl plastics are chosen because they can be readily bonded to asbestos by commercially available and relatively inexpensive fire-resistant bonding agents which also bond Kraft paper to asbestos and to aluminum.

Aluminum is chosen as an outer layer because its polished surface operates as a thermal reflector of the solar heat accumulating under the roof and between the roof and ceiling. It thus provides effective thermal insulation while constituting an additional vapor barrier. It also is noncorrosive and may be readily bonded to Kraft paper by the above-mentioned adhesives.

Asbestos is used for its effective thermal insulating qualities as well as its high fire resistance which imparts to the entire sheeting a high degree of such resistance. The air cushion between the ceiling made of the sheeting of this invention and the roof produces additional thermal insulation.

However, a relatively thin sheet of asbestos will fully serve the purpose of this layer in the laminate when it is combined with another relatively thin sheet of fire-resistant Kraft paper which is much less expensive. Thus, the less expensive combined layers of fire-resistant Kraft paper and asbestos have the same technical effect in the laminate as an asbestos layer of the same thickness would have but which would be much more expensive.

The selected combination of aluminum, Kraft paper and asbestos impart to the sheeting a high degree of thermal insulating properties.

The reinforcing metallic grating gives to the sheeting good mechanical properties so that they may be used, if desired, to support supplementary insulating materials, such as rock or glass wool, when used for ceilings. These mechanical properties will be maintained since the reinforcing grating constitutes the core of the laminate and is thus protected against any corrosion. A galvanized steel grating is particularly useful since it is not attacked by rust or corrosion, has satisfactory durability, has high tensile strength, and thus forms a particularly good support over long extensions.

It will be appreciated, therefore, that the selection and combination of the laminations produces a synergistic effect producing a laminated sheeting of great strength, high thermal insulating power, and vapor impermeability.

In a specific embodiment of the fire-resistant sheeting of the present invention, which I prefer, the laminations have the following dimensions:

Aluminum sheet: about 0.01 mm. thickness.
Fire-resistant Kraft paper sheet: about 0.1 mm. thickness.
Metallic grating: galvanized steel rods having a diameter of about 0.5 mm. with meshes of about 30 mm. width and length.
Asbestos sheet: about 0.35 mm. to 0.40 mm. thickness.

The synthetic fire-resistant bonding agent was a commercially available polyvinyl alcohol based adhesive containing antimony trichloride.

This sheeting was relatively light, flexible and thin enough to permit it to be rolled up and stored in rolls to be paid out in bands of considerable length for ceiling installations. The reinforcing grating makes it possible to use the sheeting as support for supplementary insulating material. The sheeting does not only have first-class thermal insulation but also excellent fire-resistant qualities.

I claim:
1. A fire-resistant laminated sheeting consisting of
   1. an aluminum sheet,
   2. a sheet of fire-resistant Kraft paper,
   3. a synthetic fire-resistant bonding agent bonding the aluminum sheet and the Kraft paper sheet to each other,
   4. a metallic reinforcing grating,
   5. a sheet of asbestos,
   6. a synthetic fire-resistant bonding agent bonding the Kraft paper and the asbestos sheets to each other,
      a. with the bonding agent passing through the meshes defined by the grating,
   7. a vinyl synthetic resin film, and
   8. a synthetic fire-resistant bonding agent bonding the asbestos sheet and the vinyl film to each other.

2. The laminated sheeting of claim 1, wherein the aluminum sheet has a thickness of about 0.01 mm. the Kraft paper sheet has a thickness of about 0.1 mm. the metallic grating consists of galvanized steel rods having a diameter of about 0.5 mm. the meshes being about 30 mm. in width and length, and the asbestos sheet has a thickness of about 0.35 mm. to 0.40 mm.

* * * * *